United States Patent
Yamada et al.

(10) Patent No.: US 8,121,256 B2
(45) Date of Patent: Feb. 21, 2012

(54) RADIOGRAPHIC IMAGE DATA CORRECTION METHOD AND APPARATUS AND RADIOGRAPHY APPARATUS

(75) Inventors: Hideyuki Yamada, Kanagawa-ken (JP); Takao Kuwabara, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 12/457,289

(22) Filed: Jun. 5, 2009

(65) Prior Publication Data

US 2009/0304151 A1    Dec. 10, 2009

(30) Foreign Application Priority Data

Jun. 6, 2008    (JP) .................................. 2008-149256

(51) Int. Cl.
*A61B 6/00*    (2006.01)
(52) U.S. Cl. .................... 378/98.11; 378/98.7; 378/207; 382/132
(58) Field of Classification Search .................. 378/98.7, 378/98.8, 98.11, 98.12, 207; 382/128, 132, 382/270, 274
See application file for complete search history.

(56) References Cited

FOREIGN PATENT DOCUMENTS

| JP | 2005034408 A | * | 2/2005 |
|---|---|---|---|
| JP | 2006-305228 | | 11/2006 |

OTHER PUBLICATIONS

Translation for Sato (JP 2005-305228 A) published Nov. 9, 2006.*

* cited by examiner

*Primary Examiner* — Glen Kao
(74) *Attorney, Agent, or Firm* — Jean C. Edwards; Edwards Neils PLLC

(57) ABSTRACT

Offset correction based on offset correction data is performed on radiographic image data that have been read out from a radiation image detector, and the offset correction data are updated. In the offset correction method, correction data for low-frequency components and correction data for high-frequency components, as the offset correction data, are generated based on offset image data that have been read out from the radiation image detector while the radiation image detector is not irradiated with radiation. Further, the correction data for low-frequency components and the correction data for high-frequency components are separately updated.

18 Claims, 7 Drawing Sheets

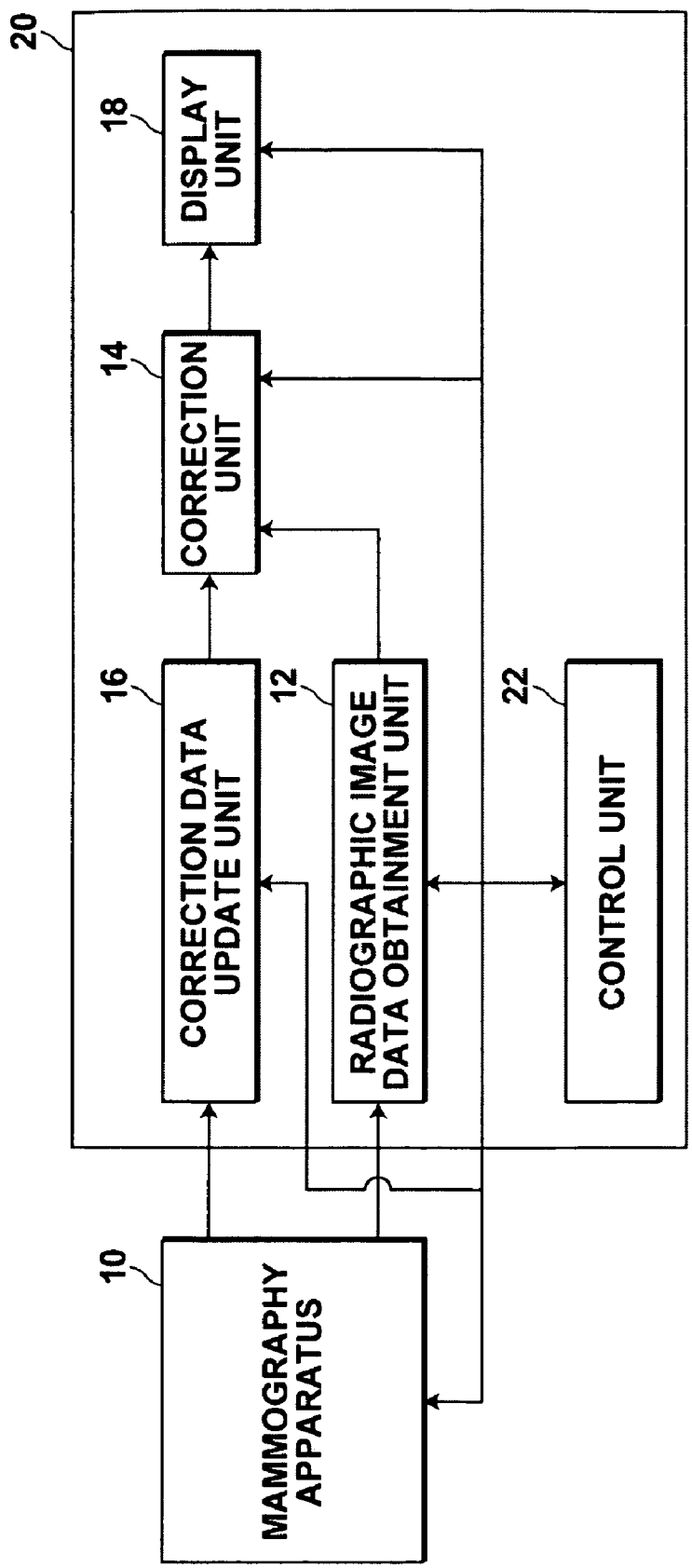

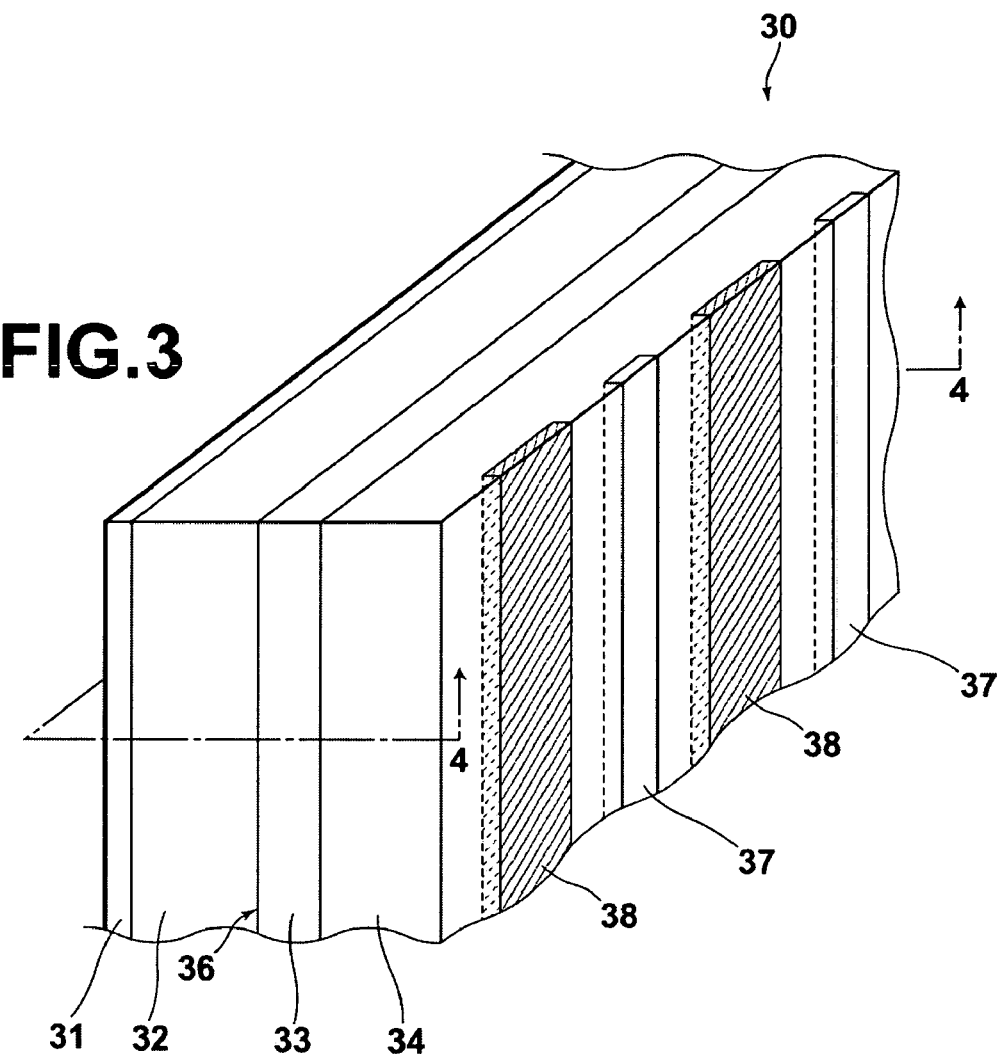
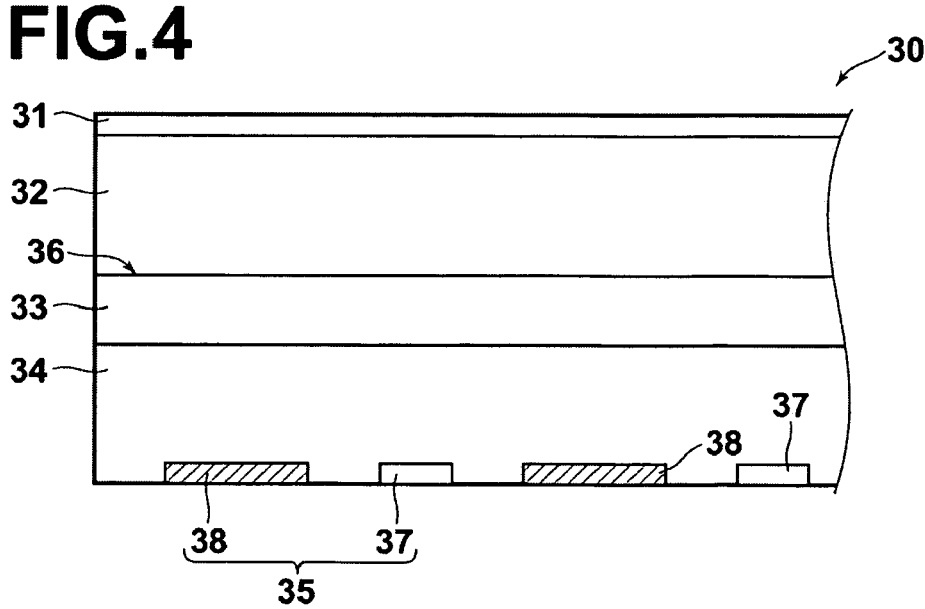

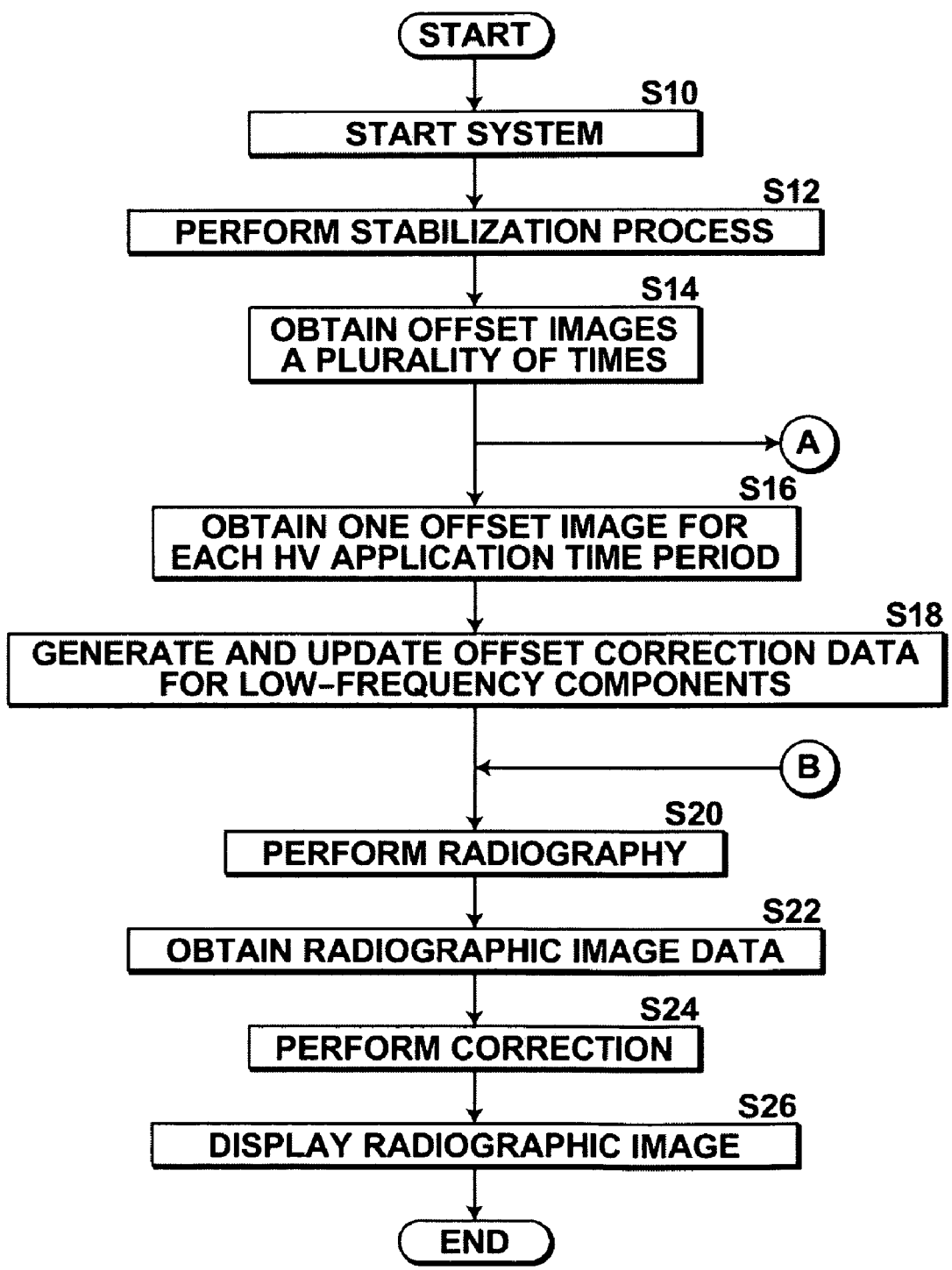

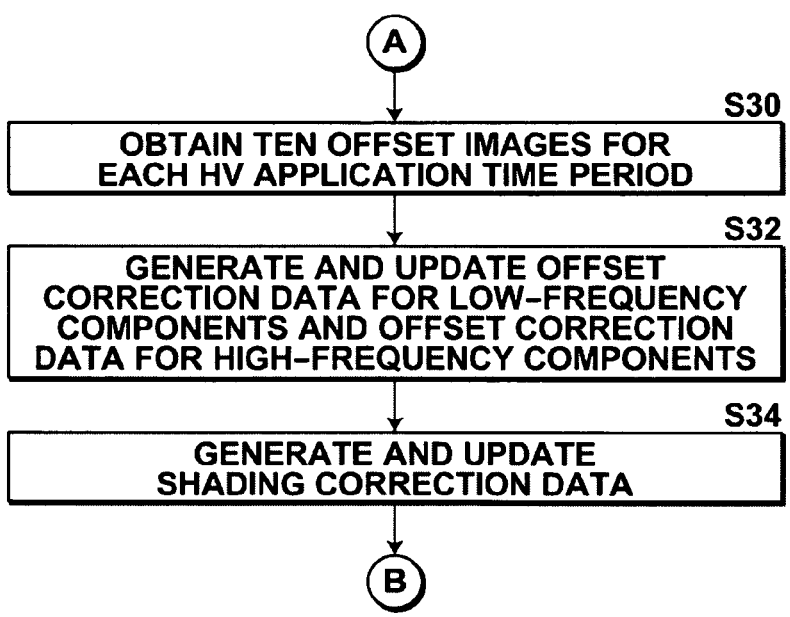

RADIOGRAPHIC IMAGE DATA CORRECTION METHOD AND APPARATUS AND RADIOGRAPHY APPARATUS

CROSS-REFERENCE TO RELATED APPLICATIONS

The present application claims priority from Japanese Patent Application No. 2008-149256, filed Jun. 6, 2008, the contents of which are herein incorporated by reference in their entirety.

BACKGROUND OF THE INVENTION

1. Field of the Invention

The present invention relates to a radiographic image data correction method and apparatus that performs, based on offset correction data, offset correction on radiographic image data that have been read out from a radiation image detector. Further, the present invention relates to a radiography apparatus.

2. Description of the Related Art

Conventionally, various kinds of radiation image detectors that record radiographic images of a subject by irradiation with radiation that has been transmitted through the subject have been proposed and used in medical fields and the like.

The radiation image detectors are, for example, a radiation image detector using amorphous selenium that generates charges by irradiation with radiation. As such a radiation image detector, a light-readout-type radiation image detector has been proposed.

For example, as the light-readout-type radiation image detector, a radiation image detector including a first electrode layer, a photoconductive layer for recording, a charge transfer layer, a photoconductive layer for readout, and a second electrode layer has been proposed. In the radiation image detector, these layers are superposed one on another in the mentioned order. The first electrode layer transmits radiation that carries a radiographic image, and the photoconductive layer for recording generates charges by irradiation with the radiation that has been transmitted through the first electrode layer. The charge transfer layer acts as an insulator with respect to charges of one of the polarities generated in the photoconductive layer for recording, and acts as a conductor with respect to charges of the other polarity generated in the photoconductive layer for recording. The photoconductive layer for readout generates charges by irradiation with readout light, and the second electrode layer includes transparent linear electrodes that transmit the readout light and light-shield linear electrodes that block the readout light.

When a radiographic image is recorded in the light-readout-type radiation image detector, as described above, first, a negative voltage is applied to the first electrode layer of the radiation image detector by a high-voltage source. While the negative voltage is applied to the first electrode layer, radiation that has been transmitted through the subject, and which carries a radiographic image of the subject, is output to the radiation image detector from the first electrode layer side of the radiation image detector.

Further, the radiation that has been output to the radiation image detector is transmitted through the first electrode layer, and irradiates the photoconductive layer for recording. Further, pairs of charges (dipoles) are generated in the photoconductive layer for recording by irradiation with the radiation. The positive charges of the dipoles are combined with negative charges charged in the first electrode layer, and disappear. Further, the negative charges of the dipoles are stored, as latent image charges, in a charge-storage portion that is formed at the interface between the photoconductive layer for recording and the charge transfer layer.

Next, readout light is output to the radiation image detector from the second electrode layer side while the first electrode layer is grounded. The readout light is transmitted through the transparent linear electrodes, and irradiates the photoconductive layer for readout. Positive charges are generated in the photoconductive layer for readout by irradiation with the readout light, and the positive charges are combined with the latent image charges in the charge-storage portion. Further, an electric current flows when the negative charges generated in the photoconductive layer for readout combine with the positive charges charged in the transparent linear electrodes and the light-shield linear electrodes, and the electric current is detected by a charge amplifier connected to the light-shield linear electrodes. Accordingly, radiographic image data corresponding to the radiographic image are read out.

Here, performing so-called offset correction on the radiographic image data that are output from the radiation image detector has been proposed.

Offset correction data that are used for the offset correction are obtained by applying a high voltage to the first electrode layer, and by performing readout while the radiation image detector is not irradiated with radiation. Since the offset correction data change according to the condition or state of the radiation image detector, it is desirable that the offset correction data are obtained at predetermined intervals.

However, since offset correction data need to be generated based on offset image data representing a plurality of images to perform accurate offset correction, long time is required to obtain the offset image data for the plurality of images. Therefore, the operation efficiency becomes lower.

Further, in recording of the radiographic image as described above, the time period of irradiation of radiation is controlled based on the radiography condition, such as the region of the body to be imaged. Further, the time period of applying the high voltage is controlled in various manners. Since offset generated in the radiation image detector differs depending on the time period of applying the high voltage, offset correction data for each time period of applying the high voltage are necessary to perform highly accurate offset correction. Therefore, it is necessary to obtain offset image data representing a plurality of images for each time period of applying the high voltage. Hence, longer time becomes necessary for processing.

Japanese Unexamined Patent Publication No. 2006-305228 proposes a method for increasing the length of intervals of updating correction data by determining the update timing of the correction data by monitoring the image data output from the radiation image detector. However, it is impossible to reduce the time period of update processing, itself.

Further, in addition to the offset correction, sensitivity correction is performed on the radiographic image data output from the radiation image detector. It is desirable that the sensitivity correction data that are used for sensitivity correction are updated at predetermined intervals in a manner similar to the offset correction data. Further, there is a problem that a very long time period is required to obtain the sensitivity correction data in a manner similar to the obtainment of the offset correction data.

SUMMARY OF THE INVENTION

In view of the foregoing circumstances, it is an object of the present invention to provide a radiographic image data correction method and apparatus that can reduce the length of time (a time period) for updating the correction data for correcting offset and sensitivity. Further, it is another object of the present invention to provide a radiography apparatus.

A first radiographic image data correction method of the present invention is a radiographic image data correction method comprising the steps of:

performing offset correction or sensitivity correction on radiographic image data representing a radiographic image, the radiographic image data having been read out from a radiation image detector that stores the radiographic image, by using correction data for correcting offset or sensitivity; and updating the correction data, wherein correction data for low-frequency components and correction data for high-frequency components are generated, as the correction data, based on image data for correction that have been read out from the radiation image detector, and wherein the correction data for low-frequency components and the correction data for high-frequency components are separately updated.

In the first radiographic image data correction method of the present invention, the time interval of updating the correction data for high-frequency components may be longer than the time interval of updating the correction data for low-frequency components.

Further, the number of pieces of the image data for correction that are used to generate the correction data for low-frequency components may be smaller than the number of pieces of the image data for correction that are used to generate the correction data for high-frequency components.

Further, the image data for correction may be obtained for each obtainment mode, and the correction data for low-frequency components and the correction data for high-frequency components for each of the obtainment modes may be generated and updated based on the image data for correction obtained for each of the obtainment modes.

Further, the correction data for high-frequency components may be generated based on a plurality of pieces of image data for correction that have been used to update the correction data for low-frequency components a plurality of times.

A second radiographic image data correction method according to the present invention is a radiographic image data correction method comprising the steps of:

performing offset correction and sensitivity correction on radiographic image data representing a radiographic image, the radiographic image data having been read out from a radiation image detector that stores the radiographic image, by using offset correction data for correcting offset and sensitivity correction data for correcting sensitivity; and updating the offset correction data and the sensitivity correction data, wherein offset correction data for low-frequency components and offset correction data for high-frequency components are generated, as the offset correction data, based on image data for offset correction that have been read out from the radiation image detector, and wherein sensitivity correction data for low-frequency components and sensitivity correction data for high-frequency components are generated, as the sensitivity correction data, based on image data for sensitivity correction that have been read out from the radiation image detector, and wherein the offset correction data for low-frequency components and the offset correction data for high-frequency components are separately updated, and wherein the sensitivity correction data for low-frequency components and the sensitivity correction data for high-frequency components are separately updated, and wherein the time interval of updating the offset correction data for low-frequency components is shorter than the time interval of updating the sensitivity correction data for low-frequency components, and wherein the time interval of updating the offset correction data for high-frequency components is shorter than the time interval of updating the sensitivity correction data for high-frequency components.

A first radiographic image correction apparatus of the present invention is a radiographic image data correction apparatus comprising:

a correction unit that performs offset correction or sensitivity correction on radiographic image data representing a radiographic image, the radiographic image data having been read out from a radiation image detector that stores the radiographic image, by using correction data for correcting offset or sensitivity; and a correction data update unit that updates the correction data, wherein the correction data update unit generates correction data for low-frequency components and correction data for high-frequency components, as the correction data, based on image data for correction that have been read out from the radiation image detector, and updates the correction data for low-frequency components and the correction data for high-frequency components separately.

In the first radiographic image data correction apparatus of the present invention, the correction data update unit may update the correction data for high-frequency components at longer time intervals than update of the correction data for low-frequency components.

The correction data update unit may generate the correction data for low-frequency components by using a smaller number of pieces of image data for correction than generation of the correction data for high-frequency components.

The correction data update unit may obtain the image data for correction for each obtainment mode, and generate and update the correction data for low-frequency components and the correction data for high-frequency components for each of the obtainment modes based on the image data for correction obtained for each of the obtainment modes.

The correction data update unit may generate the correction data for high-frequency components based on a plurality of pieces of image data for correction that have been used to update the correction data for low-frequency components a plurality of times.

A second radiographic image data correction apparatus of the present invention is a radiographic image data correction apparatus comprising:

a correction unit that performs offset correction and sensitivity correction on radiographic image data representing a radiographic image, the radiographic image data having been read out from a radiation image detector that stores the radiographic image, by using offset correction data for correcting offset and sensitivity correction data for correcting sensitivity; and a correction data update unit that updates the offset correction data and the sensitivity correction data, wherein the correction data update unit generates offset correction data for low-frequency components and offset correction data for high-frequency components, as the offset correction data, based on image data for offset correction that have been read out from the radiation image detector, and generates sensitivity correction data for low-frequency components and sensitivity correction data for high-frequency components, as the sensitivity correction data, based on image data for sensitivity correction that have been read out from the radiation image detector, and wherein the correction data update unit updates the offset correction data for low-frequency components and the offset correction data for high-frequency components separately, and updates the sensitivity correction data for low-frequency components and the sensitivity correction data for high-frequency components separately, and wherein the time interval of updating the offset correction data for low-frequency components is shorter than the time interval of updating the sensitivity correction data for low-frequency components, and wherein the time interval of updating the offset correction data for high-frequency components is shorter than the time interval of updating the sensitivity correction data for high-frequency components.

Further, a first radiography apparatus according to the present invention is a radiography apparatus comprising:

a radiation irradiation unit including a radiation source that outputs radiation toward a subject and an irradiation field size limiting mechanism that limits the irradiation field size of the radiation output from the radiation source on the subject;

a radiation image detector that detects radiation that has been output by the radiation irradiation unit and transmitted through the subject, and records a radiographic image of the subject;

a radiation image data obtainment unit that obtains radiographic image data representing the radiographic image stored in the radiation image detector;

a correction unit that performs offset correction or sensitivity correction on the radiographic image data obtained by the radiographic image data obtainment unit by using correction data for correcting offset or sensitivity; and a correction data update unit that updates the correction data, wherein the correction data update unit generates correction data for low-frequency components and correction data for high-frequency components, as the correction data, based on the image data for correction that have been read out from the radiation image detector, and updates the correction data for low-frequency components and the correction data for high-frequency components separately.

In the first radiography apparatus of the present invention, the correction data update unit may update the correction data for high-frequency components at longer time intervals than update of the correction data for low-frequency components.

The correction data update unit may generate the correction data for low-frequency components by using a smaller number of pieces of image data for correction than generation of the correction data for high-frequency components.

Further, the correction data update unit may obtain the image data for correction for each obtainment mode, and generate and update the correction data for low-frequency components and the correction data for high-frequency components for each of the obtainment modes based on the image data for correction obtained for each of the obtainment modes.

Further, the correction data update unit may generate the correction data for high-frequency components based on a plurality of pieces of image data for correction that have been used to update the correction data for low-frequency components a plurality of times.

A second radiography apparatus of the present invention is a radiography apparatus comprising:

a radiation irradiation unit including a radiation source that outputs radiation toward a subject and an irradiation field size limiting mechanism that limits the irradiation field size of the radiation output from the radiation source on the subject;

a radiation image detector that detects radiation that has been output by the radiation irradiation unit and transmitted through the subject, and records a radiographic image of the subject;

a radiation image data obtainment unit that obtains radiographic image data representing the radiographic image stored in the radiation image detector;

a correction unit that performs offset correction and sensitivity correction on the radiographic image data obtained by the radiographic image data obtainment unit by using offset correction data for correcting offset and sensitivity correction data for correcting sensitivity; and a correction data update unit that updates the offset correction data and the sensitivity correction data, wherein the correction data update unit generates offset correction data for low-frequency components and offset correction data for high-frequency components, as the offset correction data, based on image data for offset correction that have been read out from the radiation image detector, and generates sensitivity correction data for low-frequency components and sensitivity correction data for high-frequency components, as the sensitivity correction data, based on image data for sensitivity correction that have been read out from the radiation image detector, and wherein the correction data update unit updates the offset correction data for low-frequency components and the offset correction data for high-frequency components separately, and updates the sensitivity correction data for low-frequency components and the sensitivity correction data for high-frequency components separately, and wherein the time interval of updating the offset correction data for low-frequency components is shorter than the time interval of updating the sensitivity correction data for low-frequency components, and wherein the time interval of updating the offset correction data for high-frequency components is shorter than the time interval of updating the sensitivity correction data for high-frequency components.

In the first radiographic image data correction method and apparatus and the first radiography apparatus of the present invention, correction data for low-frequency components and correction data for high-frequency components, as the offset or sensitivity correction data, are generated based on image data for correction that have been read out from the radiation image detector. Further, the correction data for low-frequency components and the correction data for high-frequency components are separately updated. Therefore, for example, the correction data for low-frequency components may be updated every day, while the correction data for high-frequency components are updated once a week. If the correction data are updated in such a manner, offset image data only for a single image are needed to generate the correction data for low-frequency components. Hence, it is possible to reduce the time period of updating the correction data for low-frequency components for each day.

Further, in the radiographic image data correction method and apparatus and the radiography apparatus of the present invention, when the correction data for high-frequency components are generated based on a plurality of pieces of image data for correction that have been used to update the correction data for low-frequency components a plurality of times, the image data for correction that have been obtained to generate the correction data for low-frequency components can be used also as the image data for correction to generate the correction data for high-frequency components. Therefore, it is not necessary to newly obtain a plurality of pieces of offset image data to generate the correction data for high-frequency components. Hence, it is possible to further reduce the time period of updating.

In the second radiographic image data correction method and apparatus and the second radiography apparatus of the present invention, offset correction data for low-frequency components and offset correction data for high-frequency components, as the offset correction data, are generated based on image data for offset correction that have been read out from the radiation image detector, and sensitivity correction data for low-frequency components and sensitivity correction data for high-frequency components, as the sensitivity correction data, are generated based on image data for sensitivity correction that have been read out from the radiation image detector. Further, the offset correction data for low-frequency components and the offset correction data for high-frequency components are separately updated, and the sensitivity correction data for low-frequency components and the sensitivity correction data for high-frequency components are separately updated. Further, the time interval of updating the offset correction data for low-frequency components is set shorter than the time interval of updating the sensitivity correction data for low-frequency components, and the time interval of updating the offset correction data for high-frequency components is set shorter than the time interval of updating the sensitivity correction data for high-frequency components. Therefore, for example, with respect to the offset correction data, the offset correction data for high-frequency components may be updated once a week, while the offset correction data for low-frequency components are updated every day. With respect to the sensitivity correction data, which require an operation of output of radiation (irradiation with radiation), the sensitivity correction data for low-frequency components may be updated once a week, and the sensitivity correction data for high-frequency components may be updated every six months. Accordingly, it is possible to reduce the operation (work or process or steps) of updating.

BRIEF DESCRIPTION OF THE DRAWINGS

FIG. 2 is a schematic block diagram illustrating the configuration of a mammogram display apparatus in the mammogram obtainment/display system illustrated in FIG. 1;

FIG. 3 is a schematic perspective view illustrating the structure of a radiation image detector in the mammogram obtainment/display system illustrated in FIG. 1;

FIG. 4 is a sectional diagram of the radiation image detector illustrated in FIG. 3 along line 4-4 in FIG. 3;

FIG. 7 is a flowchart for explaining the action of the mammogram obtainment/display system illustrated in FIG. 1; and FIG. 8 is a flowchart for explaining the action of the mammogram obtainment/display system illustrated in FIG. 1.

DESCRIPTION OF THE PREFERRED EMBODIMENTS

Figure 1:
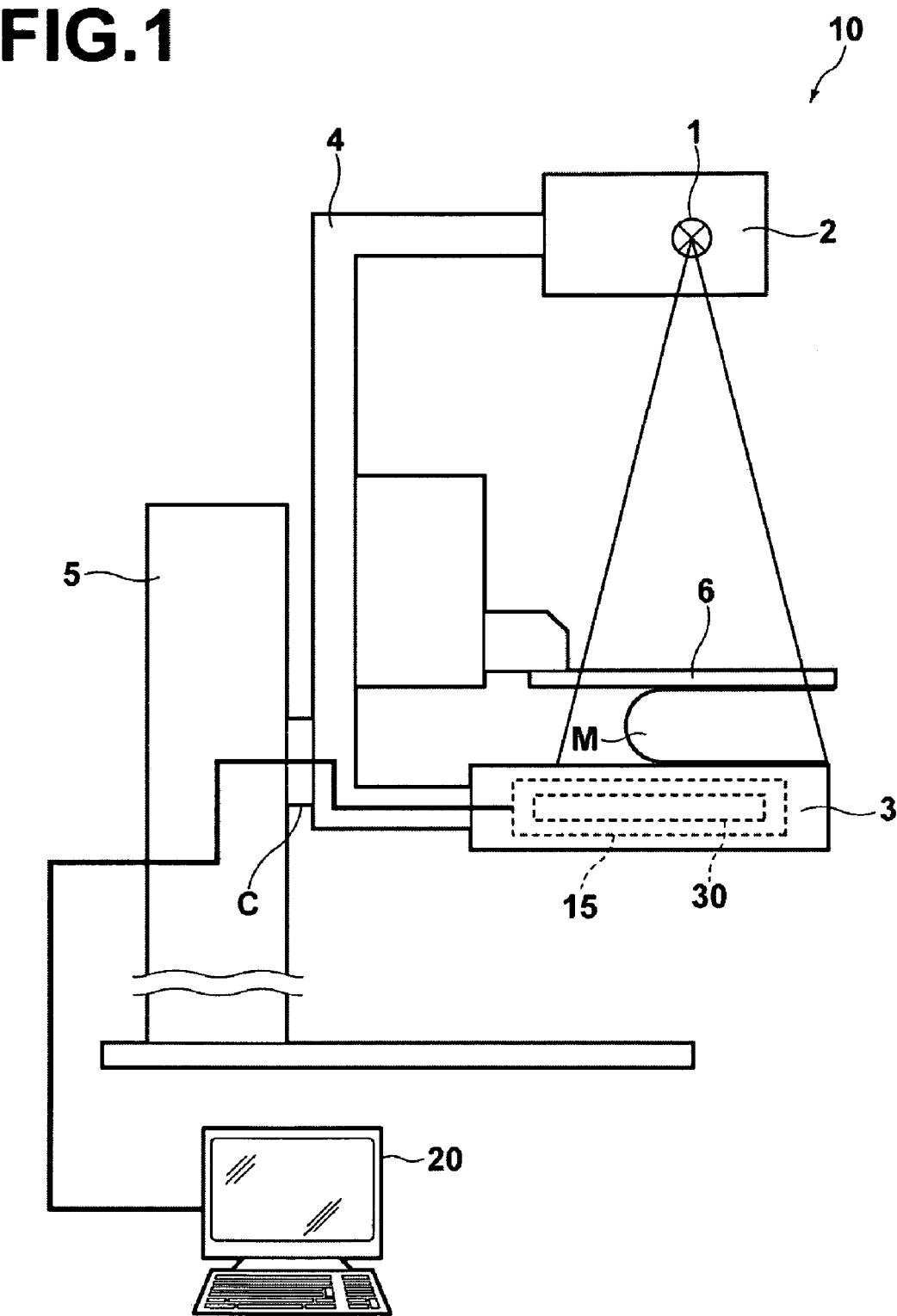
FIG. 1 is a schematic diagram illustrating the structure of a mammogram obtainment/display system to which an embodiment of an offset correction apparatus and a radiography apparatus of the present invention has been applied.

Hereinafter, a mammogram obtainment/display system using an embodiment of a radiographic image data correction apparatus of the present invention will be described with reference to drawings. The present invention relates to a method for updating correction data that are used to correct radiographic image data. Before the method for updating the correction data is described, the schematic structure of the whole system will be described. FIG. 1 is a schematic diagram illustrating the structure of the mammogram obtainment/display system of the present invention.

The mammogram obtainment/display system of the present invention includes a mammography apparatus (mammogram obtainment apparatus) 10 that performs mammography to obtain mammograms (radiographic images of breasts). Further, the mammogram obtainment/display system of the present invention includes a mammogram display apparatus 20 that displays mammograms based on radiographic image data representing the mammograms obtained by the mammography apparatus 10.

The mammography apparatus 10 includes a radiation irradiation unit 2 that stores a radiation source 1. Further, the mammography apparatus 10 includes an imaging table 3 on which breast M, which is a subject, is placed. Further, the mammography apparatus 10 includes an arm 4 attached to a base 5, and the arm 4 is rotatable with respect to shaft C. Further, the radiation irradiation unit 2 and the imaging table 3 are attached to the ends of the arm 4 in such a manner that they face each other. Further, a compression plate 6 for compressing the breast M placed on the imaging table 3 is attached to the arm 4.

A cassette 15 is set in the imaging table 3, and the cassette 15 includes a radiation image detector 30 stored in a case. Further, in addition to the radiation image detector 30, a readout light source that outputs readout light, which will be described later, to the radiation image detector 30 and a movement mechanism that moves the readout light source are provided in the cassette 15.

As for the recording methods of the radiation image detector 30, for example, the radiation image detector 30 may be either a so-called direct conversion type or a so-called indirect conversion type. Further, as for the readout methods of the radiation image detector 30, for example, the radiation image detector 30 may be either a so-called light readout type or a so-called TFT readout type. In the present embodiment, the radiation image detector 30 of the direct conversion type and the light readout type will be used. FIG. 3 is a perspective view of the radiation image detector 30 in the present embodiment. FIG. 4 is a sectional diagram of the radiation image detector 30 illustrated in FIG. 3 along line 4-4 in FIG. 3.

As illustrated in FIGS. 3 and 4, the radiation image detector 30 includes a first electrode layer 31, a photoconductive layer 32 for recording, a charge transfer layer 33, a photoconductive layer 34 for readout, and a second electrode layer 35, and these layers are deposited one on another in the mentioned order. A high-voltage bias voltage is applied to the first electrode layer 31, and the first electrode layer 31 transmits radiation that carries a radiation image. The photoconductive layer 32 for recording generates charges by irradiation with the radiation that has been transmitted through the first electrode layer 31. The charge transfer layer 33 acts as an insulator with respect to charges of one of the polarities of the charges generated in the photoconductive layer 32 for recording, and acts as a conductor with respect to charges of the other polarity. The photoconductive layer 34 for readout generates charges by irradiation with readout light. In the second electrode layer 35, a plurality of transparent linear electrodes 37, which transmit the readout light, and a plurality of light-shield linear electrodes 38, which block the readout light, are alternately arranged at predetermined intervals. The plurality of transparent linear electrodes 37 and the plurality of light-shield linear electrodes 38 are arranged in such a manner that they are parallel to each other. Further, a charge storage portion 36 is formed in the vicinity of the interface between the photoconductive layer 32 for recording and the charge transfer layer 33. The charge storage portion 36 stores (accumulates) charges generated in the photoconductive layer 32 for recording. Each of the aforementioned layers is sequentially formed on a glass substrate from the second electrode layer 35, and in FIGS. 3 and 4, the glass substrate is not illustrated. Further, as the material of each of the layers, known materials may be used. Therefore, detailed description of the materials will be omitted.

Here, the action of recording a radiographic image in the radiation image detector 30 and the action of reading out the radiographic image therefrom will be described.

Figure 5A:
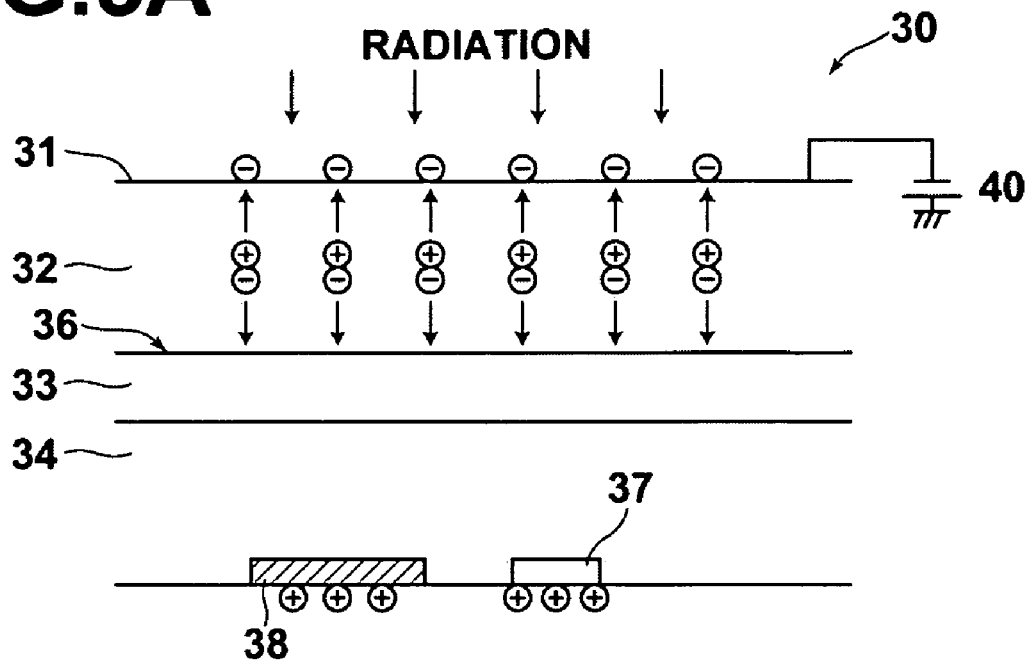
FIG. 5A is a diagram for explaining an action of recording a radiation image in the radiation image detector illustrated in FIG. 3.

First, as illustrated in FIG. 5A, a negative voltage is applied to the first electrode layer 31 of the radiation image detector 30 by a high-voltage power source 40. While the negative voltage is applied to the first electrode layer 31, the radiation image detector 30 is irradiated with radiation that carries a radiographic image of a subject, which has been transmitted through the subject, from the first electrode layer 31 side of the radiation image detector 30.

Figure 5B:
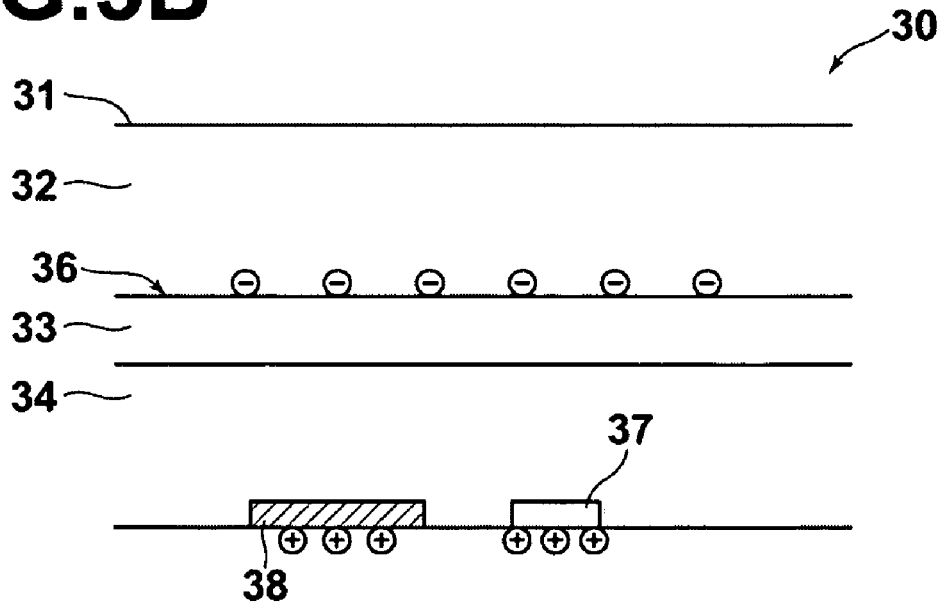
FIG. 5B is a diagram for explaining an action of recording a radiation image in the radiation image detector.

Further, the radiation that has been output to the radiation image detector 30 is transmitted through the first electrode layer 31, and the photoconductive layer 32 for recording is irradiated with the radiation. In the photoconductive layer 32 for recording, pairs of charges (dipoles) are generated by irradiation with the radiation. The positive charges in the pairs of charges combine with negative charges charged in the first electrode layer 31, and disappear (being cancelled). Further, the negative charges in the pairs of charges are stored, as latent image charges, in the charge storage portion 36 formed at the interface between the photoconductive layer 32 for recording and the charge transfer layer 33 (please refer to FIG. 5B).

Figure 6:
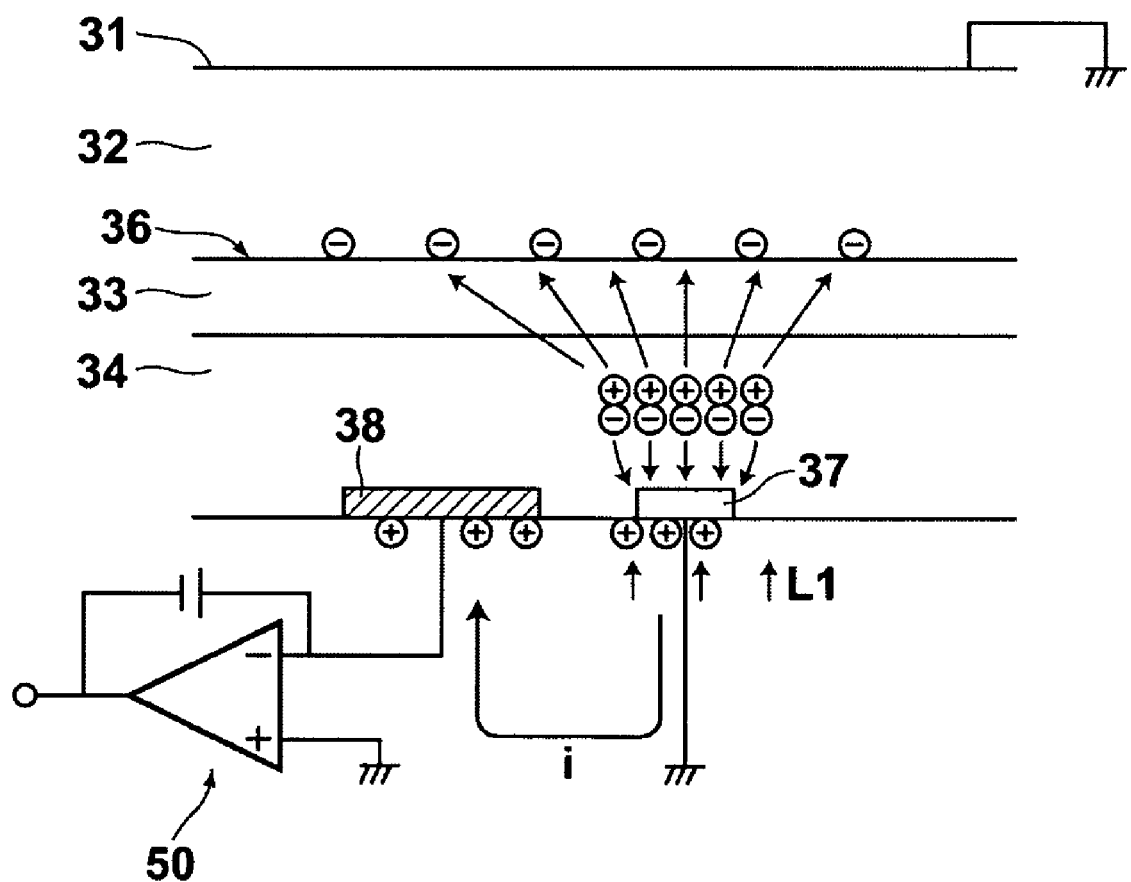
FIG. 6 is a diagram for explaining an action of reading out a radiation image from the radiation image detector illustrated in FIG. 3.

Next, as illustrated in FIG. 6, while the first electrode layer 31 is grounded, a readout light source (not illustrated) that has linear form is scan-operated, and readout light L1 that has linear form is output to the radiation image detector 30 from the second electrode layer 35 side. The readout light L1 is transmitted through the transparent linear electrode 37, and the photoconductive layer 34 for readout is irradiated with the readout light L1. Positive charges generated in the photoconductive layer 34 for readout by irradiation with the readout light L1 combine with the latent image charges in the charge storage portion 36. Further, negative charges generated in the photoconductive layer 34 for readout combine with positive charges charged in the light-shield linear electrode 38 through a charge amplifier 50 connected to the light-shield linear electrode 38.

When the negative charges generated in the photoconductive layer 34 for readout and the positive charges charged in the light-shield linear electrode 38 combine with each other, a current (electric current) flows into the charge amplifier 50. The current is integrated, and detected as an image signal. Accordingly, the image signal corresponding to the radiation image is read out. Further, processing, such as A/D (analog to digital) conversion, is performed on the image signal, and the processed data is output as radiation image data.

As illustrated in FIG. 2, the mammogram display apparatus 20 includes a radiographic image data obtainment unit 12, a correction unit 14, a correction data update unit 16, a display unit 18, and a control unit 22. The radiographic image data obtainment unit 12 obtains radiographic image data that have been read out from the radiation image detector in the mammography apparatus 10. The correction unit 14 performs offset correction or the like on the radiographic image data obtained by the radiographic image data obtainment unit 12. The correction data update unit 16 updates correction data that are used in the correction unit 14. The display unit 18 displays a radiographic image based on the radiographic image data that have been corrected by the correction unit 14. The control unit 22 controls the whole system by outputting control signals to the mammography apparatus 10 and each of the aforementioned units in the mammogram display apparatus 20.

The radiographic image data obtainment unit 12 includes a memory for storing the radiographic image data. The radiographic image data obtainment unit 12 stores received (input) radiographic image data in the memory, and outputs the radiographic image data stored in the memory to the correction unit 14.

The correction unit 14 performs correction processing, such as offset correction and shading (sensitivity) correction, on the received radiographic image data.

The correction data update unit 16 stores correction data that are used to perform correction processing, such as the offset correction and the shading (sensitivity) correction, in the correction unit 14. Further, the correction data update unit 16 updates the correction data in predetermined cycles (at predetermined intervals). The timing of update will be described later.

The display unit 25 includes a monitor, and displays the whole radiographic image including the radiographic image of the breast (mammogram) on the monitor.

Next, the action of the mammogram obtainment/display system of the present invention will be described with reference to FIGS. 1 through 6 and the flowcharts illustrated in FIGS. 7 and 8.

In the mammogram obtainment/display system of the present invention, a processing sequence that is performed daily (every day) and a processing sequence that is performed once a week differ from each other. First, the sequence that is performed every day will be described with reference to the flowchart of FIG. 7.

First, the whole mammogram obtainment/display system is turned on (power is supplied to the whole system), and the whole system is started (step S10). Next, stabilization processing of the radiation image detector 30 in the mammography apparatus 10 is performed (step S12). This processing is performed to stabilize the radiation image detector 30, and scan operation with the readout light is not performed in this processing.

Next, the radiation image detector 30 obtains offset image data a plurality of times (step S14). When the offset image data are obtained, a high voltage is applied to the first electrode layer 31 of the radiation image detector only for a predetermined time period while the radiation image detector 30 is not irradiated with radiation. After the application of the voltage is stopped, the radiation image detector 30 is scanned with readout light to read out data.

Next, for each high-voltage (hereinafter, referred to as "HV") application time period, offset image data are obtained once (step S16). In the mammogram obtainment/display system of the present invention, radiographic images can be obtained in a plurality of different HV application time periods, and an imaging mode for each of the HV application time periods has been set. Further, since the offset included in the radiographic image data differs depending on the HV application time period, it is necessary to prepare offset correction data for each of the HV application time periods. Therefore, the offset image data are obtained once for each of the HV application time periods, as described above, to prepare offset correction data for each of the HV application time periods. In the present embodiment, the offset image data are obtained once in each of the Hv application time periods, as described above. Alternatively, obtainment of radiographic images in a plurality of radiation irradiation (output) time periods may be made possible, and an imaging mode (an image capture mode or a radiography mode) for each of the radiation irradiation time periods may be set. Further, offset image data may be obtained once for each of the imaging modes, in other words, for each of the radiation irradiation time periods. In the following descriptions, the data obtained for each of the Hv application time periods may be obtained for each of the radiation irradiation time periods.

Next, the offset image data for each of the HV application time periods are used, and offset correction data are generated for each of the HV application time periods. Further, the previously-set offset correction data are updated by using the generated offset correction data. In this system, offset correction data for high-frequency components and offset correction data for low-frequency components are prepared as the offset correction data, and offset correction is performed by using the offset correction data for high-frequency components and offset correction data for low-frequency components. However, in the sequence that is performed everyday, offset image data for a single image that have been obtained as described above are used, and only the offset correction data for low-frequency components are generated, and updated (step S18). The offset correction data for low-frequency components are generated, for example, by performing moving average processing on the offset image data or by performing smoothing processing, such as median filter processing, on the offset image data. Further, the offset correction data for low-frequency components are used to correct the offset for the low-frequency components of the offset included in the radiographic image data. Further, the offset correction data for high-frequency components are used to correct the offset for the high-frequency components of the offset included in the radiographic image data. Further, in this system, offset correction data for low-frequency components and offset correction data for high-frequency components for each of the HV application time periods are set in advance as initial setting, and the offset correction data for the low-frequency components are updated every day, as described above.

The processing in steps S12 through S18 is performed immediately after the system is started, and in the present embodiment, the processing in steps S12 through S18 is performed only once a day. With respect to generation and update of the correction data, the correction data update unit 16 detects the first start operation of the system on the day (the earliest start time of the system on the day), and outputs a detection signal indicating the detection of the first start operation to the control unit 22. Further, the correction data update unit 16 operates together with the control unit 22, and obtains the offset image data. Further, the correction data update unit 16 generates and updates the correction data.

After the update of the offset correction data is completed as described above, one of a plurality of imaging modes (image capture modes or radiography modes) that have been set in advance is selected by an operator (a radiologist or a doctor) by using a predetermined selection signal input unit. The selection signal is output to the control unit 22, and radiography (obtainment of a radiographic image) based on the selected imaging mode is performed (step S20).

Specifically, first, a subject (patient) stands on a side of the mammography apparatus 10. The height of the imaging table 3 is adjusted based on the height of the subject. Further, the arm 4 is rotated based on the size and shape of the breast of the subject. Further, the breast of the subject is set on the imaging table 3, and the compression plate 6 is moved so that the thickness of the breast becomes appropriate for imaging (mammography).

When the compression of the breast is completed, radiation is output from the radiation source 1 of the radiation irradiation unit 2, and the breast is irradiated with the radiation. The cassette 15 in the imaging table 3 is irradiated with the radiation that has been transmitted through the breast of the subject, and a radiographic image of the breast (mammogram) is recorded in the radiation image detector 30 in the cassette 15. Accordingly, the mammogram is obtained (mammography is performed). At this time, the time period of irradiating the subject with radiation and the time period of HV application correspond to the imaging mode selected by the operator.

Next, radiographic image data representing the mammogram recorded in the radiation image detector 30 in the cassette 15 are read out. The radiographic image data are output to the mammogram display apparatus 20, and obtained by the radiographic image data obtainment unit 12. Further, the radiographic image data are stored in the memory of the radiographic image data obtainment unit 12 (step S22).

The radiographic image data obtained by the radiographic image data obtainment unit 12 are output to the correction unit 14.

Further, the correction unit 14 performs offset correction and shading correction processing on the radiographic image data (step S24). With respect to the offset correction, the correction unit 14 performs offset correction for low-frequency components and offset correction for high-frequency components by using offset correction data for low-frequency components and offset correction data for high-frequencies, respectively, as described above. Further, the correction unit 14 performs shading correction based on shading correction data that have been prepared in advance. With respect to the shading correction data, shading correction data for low-frequency components and shading correction data for high-frequency components are generated and stored in the correction data update unit 16 before this system is shipped from the manufacturer of the system. The correction unit 14 performs shading correction for low-frequency components and shading correction for high-frequency components by using the shading correction data for low-frequency components and the shading correction data for high-frequency components, respectively. With respect to the shading correction data, only the shading correction data for low-frequency components are updated once a week. The method for generating the update data will be described later together with the processing sequence for each week. Further, the correction data that are used in the offset correction and the shading correction are correction data corresponding to the HV application time period of the imaging mode that has been selected by the operator in obtainment of the radiograph in step S20. The shading correction is performed by using shading correction data that have been obtained by adopting two different doses of radiography.

Further, the correction unit 14 outputs the radiographic image data on which the offset correction and the shading correction have been performed to the display unit 18. The display unit 18 displays a radiographic image based on the corrected radiographic image data on the monitor (step S26).

Next, the processing sequence that is performed once a week in this system will be described with reference to the flowcharts illustrated in FIGS. 7 and 8.

With respect to the sequence that is performed once a week, the processing from step S10 through step S14 in FIG. 7 is the same as the processing in the sequence performed every day.

In the sequence that is performed once a week, after step S14, offset image data are obtained ten times for each of the HV application time periods corresponding to the imaging modes. Accordingly, offset image data representing ten images are obtained for each of the HV application time periods (step S30).

Next, offset correction data for each of the HV application time periods are generated by using the offset image data representing ten images for each of the HV application time periods. Further, the previously-set offset correction data are updated. In the sequence of processing that is performed once a week, both of the offset correction data for low-frequency components and the offset correction data for high-frequency components are generated, and the previously-set offset correction data are updated (step S32). With respect to the offset correction data for low-frequency components, offset image data representing one of the ten images are used. The offset correction data for low-frequency components are generated by performing smoothing processing as described above by using the offset image data representing the single image. Meanwhile, the method for generating the offset correction data for high-frequency components is as follows. First, offset image data Doff1 through Doff10 for ten images are averaged to obtain data Dofave representing a single image. This process of averaging is performed to remove random noise that changes in every imaging. Next, moving-average or filter processing is performed on the data Dofave to generate data Dofave' representing a blurred image. Further, the data Dofave' is subtracted from the data Dofave to obtain offset correction data Dh for high-frequency components. Further, shading correction data are generated, and the previously-set shading correction data are updated (step S34). Specifically, images for generating shading correction data are captured by adopting two different doses for each of the HV application time periods corresponding to the imaging modes. The images for generating shading correction data are so-called flat images that have uniform density in the entire areas of the images. Further, two kinds of shading correction image data are obtained for each of the HV application time periods by reading out each of the images for generating the shading correction data corresponding to the two doses. With respect to the two kinds of shading correction image data, only the shading correction data for low-frequency components are generated. The shading correction data for low-frequency components are generated, for example, by performing moving-average processing or smoothing processing, such as median-filter processing, on the shading correction image data. In the present embodiment, only the shading correction data for low-frequency components are updated in the sequence that is performed once a week. The shading correction data for high-frequency components may be updated every six months for example.

With respect to the shading correction data for high-frequency components, first, shading correction image data representing ten images are obtained for each of the HV application time periods in a manner similar to generation of the offset correction data. Further, shading correction image data Dsh1 through Dsh10, which represent the ten images, are averaged to obtain data Dshave, representing a single image. Next, moving-average or filter processing is performed on the data Dshave to generate data Dshave', which represents a blurred image. Further, the data Dshave' is subtracted from the data Dshave to obtain shading correction data Dshh for high-frequency components.

The shading correction data Dshh for high-frequency components are obtained for each of two kinds of shading correction image data obtained by adopting two different doses.

The processing in steps S30 through S34 is performed immediately after the system is started. In the present embodiment, the processing in steps S30 through S34 is performed only once a week. With respect to the processing in steps S30 through S34, the correction data update unit 16 counts the number of days passed, and detects the first start operation of the system on the day of a week every week (time when the system is first started on the day). Further, the correction data update unit 16 outputs the detection signal to the control unit 22, and operates together with the control unit 22 to obtain the offset image data and the shading correction image data. Further, correction data are generated and updated.

After the update of the offset correction data and the shading correction data is completed as described above, one of a plurality of imaging modes that have been set in advance is selected by the operator by using a predetermined selection signal input unit, and the selection signal is sent to the control unit 22. Further, radiography (imaging of a radiograph) based on the selected imaging mode is performed (step S20 in FIG. 7).

The processing after the step S20 is similar to the processing in the sequence performed every day.

Further, generation and update of the shading correction data in step S34 may be automatically performed at predetermined intervals after step S32. Alternatively, the generation and update of the shading correction data in step S34 may be performed by an operation by the operator. When the processing is performed by the operator, the interval of processing from the processing in step S32 may become long in some cases. Therefore, when a predetermined time period has passed after the processing in step S32, the offset image data may be obtained again before the processing in step S34 is performed.

Further, in the mammogram obtainment/display system of the aforementioned embodiment, with respect to the offset correction data, the offset correction data for low-frequency components are updated every day, and the offset correction data for high-frequency components are updated once a week. However, the timing of updating is not limited to this timing as long as the interval of updating the offset correction data for high-frequency components is longer than the interval of updating the offset correction data for low-frequency components. For example, the offset correction data for low-frequency components may be updated every three days, and the offset correction data for high-frequency components may be updated every two weeks. Further, the interval of updating the offset correction data for high-frequencies may be shorter than the interval of updating the offset correction data for low-frequencies depending on the system.

Further, in the mammogram obtainment/display system of the aforementioned embodiment, with respect to the shading correction data, the shading correction data for low-frequency components are updated once a week, and the shading correction data for high-frequency components are updated every six months. However, the timing of updating is not limited to this timing as long as the interval of updating the offset correction data for high-frequency components is longer than the interval of updating the offset correction data for low-frequency components. Further, the interval of updating the shading correction data for high-frequencies may be shorter than the interval of updating the shading correction data for low-frequencies depending on the system.

In the mammogram obtainment/display system of the aforementioned embodiment, offset image data representing ten images are obtained for each of the HV application time periods once a week to generate the offset correction data for high-frequency components. However, the method obtaining the offset correction data for high-frequency components is not limited to this method. For example, in the processing sequence that is performed every day, offset image data that have been obtained to generate and update the offset correction data for low-frequency components may be stored for one week, in other words, offset image data for seven images are stored. Further, the offset correction data for high-frequency components may be generated by using the offset image data for the seven images, and the data may be updated. When the offset correction data for high-frequency components are obtained as described above, it is possible to reduce time for obtaining the offset image data.

Further, in the mammogram obtainment/display system of the aforementioned embodiment, the offset image data for each of the HV application time periods are obtained every day. However, for example, offset image data corresponding to a different HV application time period or periods may be obtained every day. Further, offset correction data corresponding to the different HV application time period or periods may be generated each day, and update may be performed. Specifically, for example, when there are seven imaging modes that have different HV application time periods from each other, each of the seven imaging modes may be assigned to each day of a week, and offset correction data corresponding to a single imaging mode may be updated each day. Consequently, update of offset correction data corresponding to all of the imaging modes is completed in a week.

Further, in the mammogram obtainment/display system of the aforementioned embodiment, with respect to the offset correction data, the offset correction data for low-frequency components are updated every day, and the offset correction data for high-frequency components are updated once a week. With respect to shading correction data, shading correction data for low-frequency components are updated once a week, and the shading correction data for high-frequency components are updated every six months. In other words, the frequency of updating the shading correction data is lower than the frequency of updating the offset correction data. Since generation of the shading correction data requires output of radiation (irradiation with radiation), more work (operation process or steps) is required to generate the shading correction data than generation of the offset correction data. Therefore, if the frequency of updating the shading correction data is less than the frequency of updating the offset correction data, the work of the operator can be reduced. Alternatively, the frequency of updating the offset correction data and the frequency of updating the shading correction data may be the same.

Further, in the mammogram obtainment/display system of the aforementioned embodiment, an electrical circuit including a charge amplifier 50 or the like is provided. The charge amplifier 50 detects a signal output from the radiation image detector 30. Alternatively, signals that are output only from the electrical circuit, excluding the signal output from the radiation image detector 30, may be detected, and when the detected signals exceed a predetermined threshold value, a warning or notice may be issued to notify the operator or the like of the failure of the electrical circuit. Alternatively, instead of outputting radiation to the radiation image detector 30, readout light may be output to the radiation image detector 30 to read out image data from the radiation image detector 30. Further, the standard deviation of the image data may be calculated, and when the value of the standard deviation exceeds a predetermined threshold value, a warning or notice may be issued to notify the operator or the like of the failure of the radiation image detector 30.

In the mammogram obtainment/display system of the aforementioned embodiment, pre-reading may be performed before the radiographic image is recorded. In the pre-reading, instead of outputting radiation to the radiation image detector 30, readout light is output to the radiation image detector 30 to read out image data from the radiation image detector 30. Further, a pixel defect map representing the position of a defect pixel or pixels may be generated based on the pre-read image data. The judgment as to whether a pixel is a defect pixel may be made in such a manner that when the pixel is not within a predetermined range, the pixel is judged as the defect pixel. Further, for example, the aforementioned pre-reading process may be performed every day, and the pre-read image data may be accumulatively averaged. Further, the pixel defect map may be generated based on the accumulatively averaged image data to update the pixel defect map every day. The defect pixel may expand when imaging is repeated every day. However, if the pixel defect map is updated as described above, it is possible to appropriately detect the defect pixel. Alternatively, instead of using the pre-read image data, for example, when output of radiation from the mammography apparatus 10 becomes possible only when an imaging menu is registered at the mammogram display apparatus 20, the image data for generating the aforementioned pixel defect map may be obtained while the imaging menu is not registered.

In the above description, a case in which the embodiment of the offset correction apparatus of the present invention is applied to the mammogram obtainment/display system has been described. However, the present invention is not limited to the mammogram obtainment/display system. The present invention may be applied to a radiographic image obtainment/display system for imaging other regions of the body, which has an aperture mechanism for changing or limiting the irradiation field size.

Further, in the mammogram obtainment/display system of the aforementioned embodiment, the radiation image detector of the so-called direct conversion type and the light readout type was used. However, the radiation image detector is not limited to the radiation image detector of such types. For example, from the view point of the recording method, a radiation image detector of a so-called indirect conversion method may be used. Further, from the view point of the readout method, a radiation image detector of a so-called TFT readout method may be used.

What is claimed is:

1. A radiographic image data correction method comprising the steps of:

performing offset correction or sensitivity correction on radiographic image data representing a radiographic image, the radiographic image data having been read out from a radiation image detector that stores the radiographic image, by using correction data for correcting offset or sensitivity;

generating, based on image data for correction which have been read out from the radiation image detector, low frequency component correction data for correcting the offset or sensitivity of low frequency components included in the radiographic image data, and high frequency component correction data for correcting the offset or sensitivity of high frequency components included in the radiographic image data, as the correction data; and updating the low frequency component correction data and the high frequency component correction data.

2. A radiographic image data correction method, as defined in claim 1, wherein a time interval of updating the correction data for high-frequency components is longer than a time interval of updating the correction data for low-frequency components.

3. A radiographic image data correction method, as defined in claim 1, wherein the number of pieces of the image data for correction that are used to generate the correction data for low-frequency components is smaller than the number of pieces of the image data for correction that are used to generate the correction data for high-frequency components.

4. A radiographic image data correction method, as defined in claim 1, wherein the image data for correction are obtained for each obtainment mode, and wherein the correction data for low-frequency components and the correction data for high-frequency components for each of the obtainment modes are generated and updated based on the image data for correction obtained for each of the obtainment modes.

5. A radiographic image data correction method, as defined in claim 1, wherein the correction data for high-frequency components are generated based on a plurality of pieces of image data for correction that have been used to update the correction data for low-frequency components a plurality of times.

6. A radiographic image data correction method comprising the steps of:
    performing offset correction and sensitivity correction on radiographic image data representing a radiographic image, the radiographic image data having been read out from a radiation image detector that stores the radiographic image, by using offset correction data for correcting offset and sensitivity correction data for correcting sensitivity;
    generating, based on image data for correction which have been read out from the radiation image detector, low frequency component offset correction data for correcting the offset of low frequency components included in the radiographic image data, high frequency component offset correction data for correcting the offset of high frequency components included in the radiographic image data, low frequency component sensitivity correction data for correcting the sensitivity of low frequency components included in the radiographic image data, and high frequency component sensitivity correction data for correcting the sensitivity of high frequency components included in the radiographic image data as the correction data; and
    updating the low frequency component offset correction data, the high frequency component offset correction data, the low frequency component sensitivity correction data, and the high frequency component sensitivity correction data separately;
    wherein a time interval of updating the offset correction data for low-frequency components is shorter than a time interval of updating the sensitivity correction data for low-frequency components, and wherein a time interval of updating the offset correction data for high-frequency components is shorter than a time interval of updating the sensitivity correction data for high-frequency components.

7. A radiographic image data correction apparatus comprising:
    a correction unit that performs offset correction or sensitivity correction on radiographic image data representing a radiographic image, the radiographic image data having been read out from a radiation image detector that stores the radiographic image, by using correction data for correcting offset or sensitivity;
    a generating unit that generates, based on image data for correction which have been read out from the radiation image detector, low frequency component correction data for correcting the offset or sensitivity of low frequency components included in the radiographic image data, and high frequency component correction data for correcting the offset or sensitivity of high frequency components included in the radiographic image data, as the correction data; and
    a correction data update unit that updates the low frequency component correction data and the high frequency component correction data separately.

8. A radiographic image data correction apparatus, as defined in claim 7, wherein the correction data update unit updates the correction data for high-frequency components at longer time intervals than updates of the correction data for low-frequency components.

9. A radiographic image data correction apparatus, as defined in claim 7, wherein the correction data update unit generates the correction data for low-frequency components by using a smaller number of pieces of image data for correction than generation of the correction data for high-frequency components.

10. A radiographic image data correction apparatus, as defined in claim 7, wherein the correction data update unit obtains the image data for correction for each obtainment mode, and generates and updates the correction data for low-frequency components and the correction data for high-frequency components for each of the obtainment modes based on the image data for correction obtained for each of the obtainment modes.

11. A radiographic image data correction apparatus, as defined in claim 7, wherein the correction data update unit generates the correction data for high-frequency components based on a plurality of pieces of image data for correction that have been used to update the correction data for low-frequency components a plurality of times.

12. A radiographic image data correction apparatus comprising:
    a correction unit that performs offset correction and sensitivity correction on radiographic image data representing a radiographic image, the radiographic image data having been read out from a radiation image detector that stores the radiographic image, by using offset correction data for correcting offset and sensitivity correction data for correcting sensitivity;
    a generating unit that generates, based on image data for correction which have been read out from the radiation image detector, low frequency component offset correction data for correcting the offset of low frequency components included in the radiographic image data, high frequency component offset correction data for correcting the offset of high frequency components included in the radiographic image data, low frequency component sensitivity correction data for correcting the sensitivity of low frequency components included in the radiographic image data, and high frequency component sensitivity correction data for correcting the sensitivity of high frequency components included in the radiographic image data as the correction data; and
    a correction data update unit that updates the low frequency component offset correction data, the high frequency component offset correction data, the low frequency component sensitivity correction data, and the high frequency component sensitivity correction data separately;

wherein a time interval of updating the offset correction data for low-frequency components is shorter than a time interval of updating the sensitivity correction data for low-frequency components, and wherein a time interval of updating the offset correction data for high-frequency components is shorter than a time interval of updating the sensitivity correction data for high-frequency components.

13. A radiography apparatus comprising:
a radiation irradiation unit including a radiation source that outputs radiation toward a subject and an irradiation field size limiting mechanism that limits the irradiation field size of the radiation output from the radiation source on the subject;
a radiation image detector that detects the radiation that has been output by the radiation irradiation unit and transmitted through the subject, and records a radiographic image of the subject;
a radiation image data obtainment unit that obtains radiographic image data representing the radiographic image stored in the radiation image detector;
a correction unit that performs offset correction or sensitivity correction on the radiographic image data obtained by the radiographic image data obtainment unit by using correction data for correcting offset or sensitivity;
a generating unit that generates, based on image data for correction which have been read out from the radiation image detector, low frequency component correction data for correcting the offset or sensitivity of low frequency components included in the radiographic image data, and high frequency component correction data for correcting the offset or sensitivity of high frequency components included in the radiographic image data, as the correction data; and
a correction data update unit that updates the low frequency component correction data and the high frequency component correction data separately.

14. A radiography apparatus, as defined in claim 13, wherein the correction data update unit updates the correction data for high-frequency components at longer time intervals than updates of the correction data for low-frequency components.

15. A radiography apparatus, as defined in claim 13, wherein the correction data update unit generates the correction data for low-frequency components by using a smaller number of pieces of image data for correction than generation of the correction data for high-frequency components.

16. A radiography apparatus, as defined in claim 13, wherein the correction data update unit obtains the image data for correction for each obtainment mode, and generates and updates the correction data for low-frequency components and the correction data for high-frequency components for each of the obtainment modes based on the image data for correction obtained for each of the obtainment modes.

17. A radiography apparatus, as defined in claim 13, wherein the correction data update unit generates the correction data for high-frequency components based on a plurality of pieces of image data for correction that have been used to update the correction data for low-frequency components a plurality of times.

18. A radiography apparatus comprising:
a radiation irradiation unit including a radiation source that outputs radiation toward a subject and an irradiation field size limiting mechanism that limits the irradiation field size of the radiation output from the radiation source on the subject;
a radiation image detector that detects radiation that has been output by the radiation irradiation unit and transmitted through the subject, and records a radiographic image of the subject;
a radiation image data obtainment unit that obtains radiographic image data representing the radiographic image stored in the radiation image detector;
a correction unit that performs offset correction and sensitivity correction on the radiographic image data obtained by the radiographic image data obtainment unit by using offset correction data for correcting offset and sensitivity correction data for correcting sensitivity;
a generating unit that generates, based on image data for correction which have been read out from the radiation image detector, low frequency component offset correction data for correcting the offset of low frequency components included in the radiographic image data, high frequency component offset correction data for correcting the offset of high frequency components included in the radiographic image data, low frequency component sensitivity correction data for correcting the sensitivity of low frequency components included in the radiographic image data, and high frequency component sensitivity correction data for correcting the sensitivity of high frequency components included in the radiographic image data as the correction data; and
a correction data update unit that updates the low frequency component offset correction data, the high frequency component offset correction data, the low frequency component sensitivity correction data, and the high frequency component sensitivity correction data separately;
wherein a time interval of updating the offset correction data for low-frequency components is shorter than a time interval of updating the sensitivity correction data for low-frequency components, and wherein a time interval of updating the offset correction data for high-frequency components is shorter than a time interval of updating the sensitivity correction data for high-frequency components.

* * * * *